C. H. BIEDERMAN.
SPRING MOUNTING FOR VEHICLES.
APPLICATION FILED JAN. 29, 1916.
1,235,643.
Patented Aug. 7, 1917.
2 SHEETS—SHEET 1.
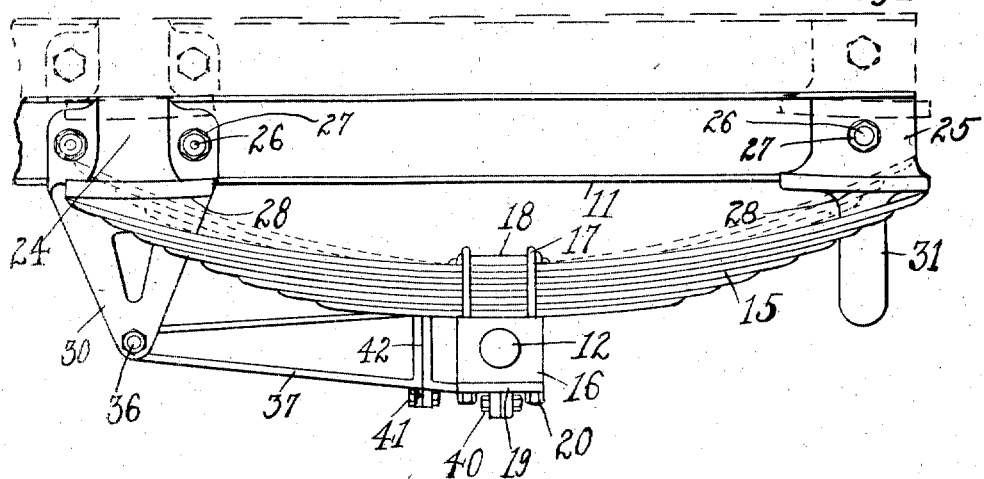
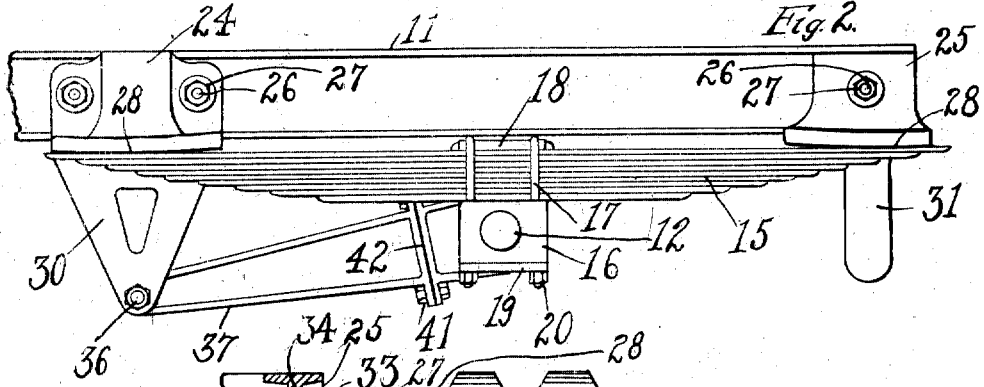
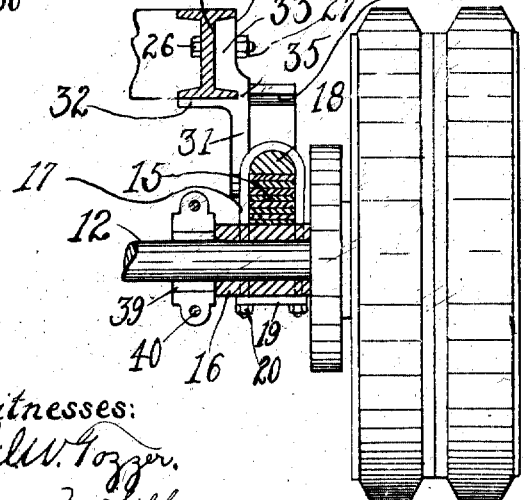
Witnesses:
Phil W. Tozzer.
Theresa M. Silber.
Inventor:
Charles H. Biederman,
by his Attorney.

C. H. BIEDERMAN.
SPRING MOUNTING FOR VEHICLES.
APPLICATION FILED JAN. 29, 1916.
1,235,643.
Patented Aug. 7, 1917.
2 SHEETS—SHEET 2.
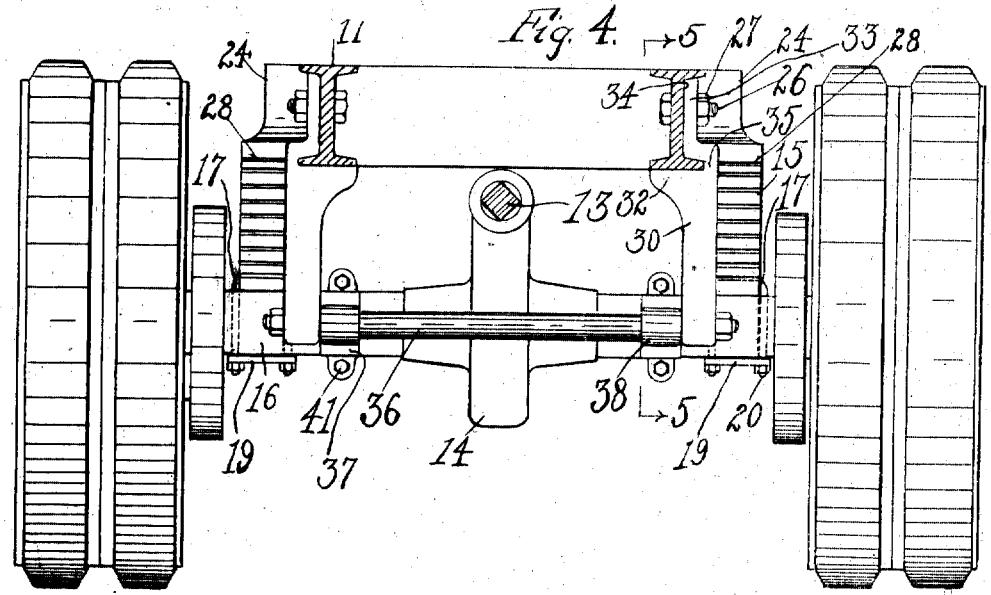
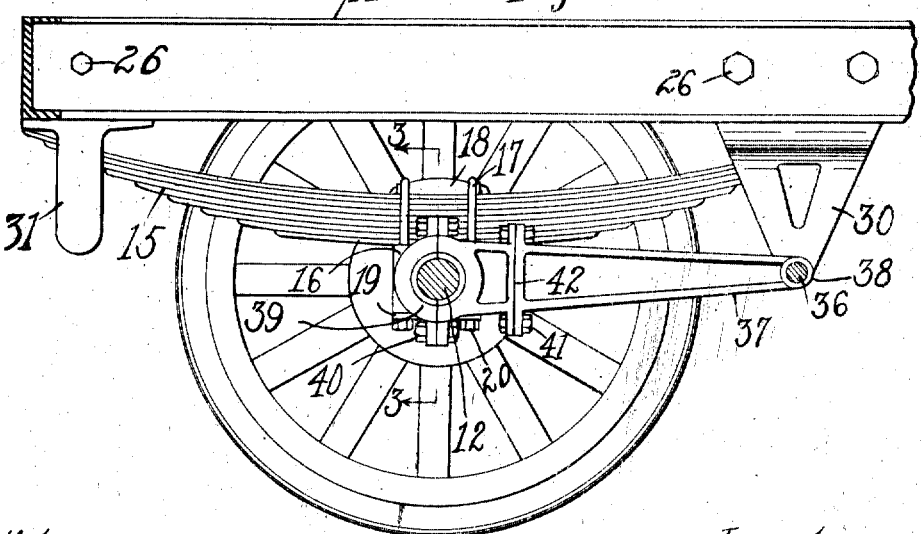
Witnesses:
Phil W. Tozzer
Theresa M. Silber
Inventor:
Charles H. Biederman,
by his Attorney

UNITED STATES PATENT OFFICE.

CHARLES H. BIEDERMAN, OF CINCINNATI, OHIO, ASSIGNOR OF ONE-HALF TO THE O. ARMLEDER COMPANY, OF CINCINNATI, OHIO, A CORPORATION OF OHIO.

SPRING-MOUNTING FOR VEHICLES.

1,235,643.  Specification of Letters Patent.  Patented Aug. 7, 1917.

Application filed January 29, 1916. Serial No. 75,139.

*To all whom it may concern:*

Be it known that I, CHARLES H. BIEDERMAN, a citizen of the United States, residing at Cincinnati, in the county of Hamilton and State of Ohio, have invented certain new and useful Improvements in Spring-Mountings for Vehicles, of which the following is a specification.

My invention relates to spring mounting for vehicles, and is especially applicable to so-called motor trucks and trailers.

It is the object of my invention to provide a novel spring mounting which will accommodate itself to great variations in load and provide easy riding qualities for the vehicle under great variations in load conditions.

It is the object of my invention, further, to provide a novel spring mounting of the character mentioned having great resilience and slight resistance under light load conditions varying to slight resilience and great resistance under heavy load conditions, the springs adapting themselves in novel manner to proper resisting and resilience conditions under various loads.

It is the object of my invention, further, to provide a floating spring structure so arranged as to provide freedom of movement between the ends of the springs and load supports thereon, further, to provide a structure of the character mentioned wherein the load supports may rebound substantially from the springs and be independent of connection with the springs; further, to provide lateral guiding means for the ends of the springs, whereby the chassis, springs, wheels and axle of the vehicle are maintained in proper lateral relation, said guiding means and springs having relatively free up and down movement; and, further, to provide springs having attachments at their middle portions to the axle, with the ends of the springs floating with relation to the chassis of the vehicle, the chassis and axle having a radius-member therebetween for locating the draft relation between the axle and the chassis.

The invention will be further readily understood from the following description and claims, and from the drawings, in which latter:

Figure 1 represents a side elevation of my improved device as applied to an axle and the chassis of a truck, showing the relations of the parts under no-load condition, the wheels being removed, and showing the chassis in rebound position in dotted lines.

Fig. 2 is a similar view of the same showing the relations of the parts under extreme load conditions.

Fig. 3 is a vertical cross-section of my improved device taken on the line 3—3 of Fig. 5, and showing one side of the chassis, the wheels being in place.

Fig. 4 is a front elevation of my improved device as applied to a rear axle of a motor-truck; and, Fig. 5 is a vertical longitudinal section of the same taken on the line 5—5 of Fig. 4.

The chassis or body of the vehicle, exemplified as the chassis of the motor truck, is exemplified at 11. 12 is the axle, represented as the rear or driven axle, driven in any suitable manner, as by means of a shaft 13 leading from the motor of the vehicle to suitable gearing in a gear-box 14, for transmitting motion to the rear axle, or axle-sections for differential rotation of the latter, in well understood manner.

Springs 15 are supported by the axle, preferably on bearings 16 about the axle, the springs being shown secured to the respective bearings by means of straps 17. The springs are shown as semi-elliptical springs, each of which comprises a plurality of spring leaves of varying lengths, the upper leaf being the longest, the lengths of the leaves thereunder decreasing in step-by-step relation.

The springs are clamped together preferably at their middle portions by means of the straps 17, which are received across the springs. A clamp-block 18 is located between the roundings of the straps at each of the springs, the straps passing through the bearing 16 and a clamp-plate 19 thereunder, the parts being clamped together by nuts 20. The ends of the springs have free lengthwise movement with relation to each other.

The chassis of the vehicle is provided with supports 24, 25, shown as blocks secured to the frame of the chassis by means of bolts 26 and nuts 27. Each of the supports has a supporting-face 28 which engages the upper face of the upper spring-leaf, the said supporting-face being preferably arranged on an arc and inclining upwardly toward the middle of the spring. The object of curving the supporting-face is to graduate and limit the area of contact thereof with the spring, thus limiting friction and providing easy end movement between the spring and the supporting-face.

Lateral guides 30, 31, are provided between the sides of the springs and the chassis, shown as walls depending from the supports 24, 25.

The side-frames of the chassis 11 are shown as channeled beams, and each of the supports as provided with a shelf 32 received under the beam and with a cheek 33 received in the channel 34 of the beam, the shelf and cheek being connected by a web 35, the bolts 26, 27, passing through said cheek and the web of said channel-beam.

A cross-rod 36 is located between the depending walls 30 at the respective sides of the chassis, radius-rods 37 being located between the cross rod and the axle 12 for forming draft-connection between the chassis of the vehicle and the axle.

In the present exemplification each of the radius-rods comprises a bearing 38 about the cross-rod and a bearing 39 about the axle. The bearing 39 is a split-bearing, the parts whereof are connected by bolts 40. To provide ease in assembling the parts, the radius-rod is a two-part rod, connected by bolts 41 at the joint 42 between the parts, and so arranged that the axle-end of the radius-rod may be assembled on the axle, and the chassis-end of the radius-rod readily attached thereto when the chassis is placed on the axle, or detached therefrom when it is desired to remove the chassis.

In my improved device the chassis and spring-ends are arranged to freely move up and down and lengthwise with relation to each other and thereby prevent undue stresses upon the springs, the springs forming shifting or floating resilient structures under the chassis, and enabling comparatively light springs of great resilience to be employed. The lateral relation between the chassis of the vehicle and the springs is maintained by the lateral guides 30, 31, between the chassis and spring, these lateral guides being limits in the direction of the width of the springs, in which direction the springs are comparatively rigid, thereby maintaining the lateral relation between the chassis, springs and wheels. The draft relation between the chassis and springs is maintained by the radius rods, thereby relieving the springs of all pulling or pushing stress in the travel of the vehicle.

The relation of the parts under substantially noload condition is shown in Fig. 1, wherein it will be noted that the chassis is supported upon the ends of the upper spring-leaf, affording great resilience and ease of riding of the vehicle. As the load increases, the upper leaf and a greater number of the lower leaves are flexed, according to the amount of load, additional spring resistance being applied by the springs as the load increases, the ends of the spring-leaves relatively shifting as flattening of the leaves progresses, for bringing a greater number of the leaves under the supports, and causing shifting of the ends of the springs for decreasing the effective lengths of the spring-leaves between said supports and the axle, and thereby further increasing their resistance.

My improved arrangement further avoids detrimental stresses upon the springs upon rebounding of the chassis of the vehicle, as the supports are free to rebound above the limits of curvatures of the springs, so as to be spaced from the springs, for instance, as indicated in dotted lines in Fig. 1, the lateral guides 30, 31, being sufficiently long to avoid rebound of the guides beyond the range of the springs, it being understood that upon rebound of the chassis the springs will also follow the rebound until their limits of curvature have been reached.

Furthermore, if for instance, one wheel of the four wheels of the truck should drop into a hole, my improved structure permits canting of the chassis for permitting the supports at the diagonally opposite corner of the chassis of the truck to rise off the spring, avoiding reverse bending of the spring and consequent rebound stresses thereon.

Having thus fully described my invention, what I claim as new and desire to secure by Letters Patent, is:

1. The combination of a vehicle chassis, an axle, superposed spring-leaves forming a leaf-spring secured to said axle, the ends of said spring-leaves curving upwardly and of gradually increasing lengths, a support on said chassis, the under surface of said support having a substantially long supporting face curving similarly to but to substantially less extent than the curvature of said spring-leaves, said supporting face supported by said ends, said ends having lengthwise movement under said support with relation to each other and to said support, and lateral guiding means between said spring-leaves and chassis.

2. The combination of a vehicle chassis, an axle, superposed spring-leaves forming a leaf-spring secured to said axle, the ends of said spring-leaves curving upwardly and of gradually increasing lengths, supports on said chassis, the under surfaces of said supports respectively having a substantially long supporting face curving similarly to but to substantially less extent than the curvature of said spring-leaves, said supporting faces supported on said ends, said ends having lengthwise movement under said supports with relation to said supports, and lateral guiding means between said spring-leaves and chassis.

3. In a device of the character described, the combination of a chassis having channeled beams as side pieces, an axle, leaf springs secured about said axle, supports on said chassis having supporting faces supported on said springs, said supports provided with depending walls forming lateral guiding means for said springs, said supports provided with shelves received under said beams and with cheeks received in the channels of said beams, said shelves and supporting faces being at opposite sides of said depending walls, and means securing said cheeks in said channels.

In testimony whereof, I have hereunto signed my name in the presence of two subscribing witnesses.

CHARLES H. BIEDERMAN.

Witnesses:
 THERESA M. SILBER,
 CHARLES E. WEBER.